US012695909B2

(12) United States Patent
Nguyen Canh et al.

(10) Patent No.: US 12,695,909 B2
(45) Date of Patent: Jul. 28, 2026

(54) METHOD AND APPARATUS FOR ADAPTIVE WEIGHTS FOR PARALLELOGRAM PREDICTION

(71) Applicant: TENCENT AMERICA LLC, Palo Alto, CA (US)

(72) Inventors: Thuong Nguyen Canh, San Bruno, CA (US); Xiaozhong Xu, Palo Alto, CA (US); Chao Huang, Palo Alto, CA (US); Shan Liu, Palo Alto, CA (US); Jun Tian, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/799,578

(22) Filed: Aug. 9, 2024

(65) Prior Publication Data

US 2025/0063193 A1 Feb. 20, 2025

Related U.S. Application Data

(60) Provisional application No. 63/544,500, filed on Oct. 17, 2023, provisional application No. 63/532,583, filed on Aug. 14, 2023.

(51) Int. Cl.
*H04N 19/597* (2014.01)
*H04N 19/126* (2014.01)
*H04N 19/17* (2014.01)

(52) U.S. Cl.
CPC ......... *H04N 19/597* (2014.11); *H04N 19/126* (2014.11); *H04N 19/17* (2014.11)

(58) Field of Classification Search
CPC ..... H04N 19/597; H04N 19/126; H04N 19/17
See application file for complete search history.

(56) References Cited

U.S. PATENT DOCUMENTS

2019/0156550 A1* 5/2019 Stanard .................. G06T 15/06
2020/0388086 A1* 12/2020 Alkouh .................. G06T 17/00

OTHER PUBLICATIONS

Martin Isenburg et al., "Compressing Polygon Mesh Geometry with Parallelogram Prediction", appeared in Visualization, 2002, pp. 1-6.
Ingrid Daubechies et al., "Factoring Wavelet Transforms Into Lifting Steps", ResearchGate, Jun. 1998, 27 pages.
"Information technology—Coded representation of immersive media—Part 29: Video-based dynamic mesh coding (V-DMC)", ISO 23090-29:2023(E) ISO/IEC JTC 1/SC 29/WG 7, Feb. 10, 2023, 74 pages.

(Continued)

*Primary Examiner* — On S Mung
(74) *Attorney, Agent, or Firm* — Sughrue Mion, PLLC

(57) ABSTRACT

A method performed includes encoding a first vertex, a second vertex, and a third vertex of a first face of a polygon mesh; determining a set of adaptive weights that comprise a first weight, a second weight, and a third weight; and performing parallelogram prediction to predict a fourth vertex in a second face of the polygon mesh by applying the first weight to the first vertex, the second weight to the second vertex, and the third weigh to the third vertex, in which the first weight is less than 0.8 and greater than 0, in which the second weight is greater than −0.8 and less than 0, and in which the third weight is less than 0.9 and greater than 0.

13 Claims, 13 Drawing Sheets

(56)  References Cited

OTHER PUBLICATIONS

Khaled Mammou et al., "[V-CG] Apple's Dynamic Mesh Coding CfP Response", Apple Inc., International Organisation for Standardisation Organisation Internationale De Normalisation ISO/IEC JTC 1/SC 29/WG 7 Coding of Moving Pictures and Audio, ISO/IEC JTC 1/SC 29/WG 7 m59281, online Apr. 2022, 24 pages.
Jean-Eudes Marvie et al., "[V-DMC][EE4.4] An efficient Edgebreaker implementation", International Organisation for Standardisation Organisation Internationale De Normalisation ISO/IEC JTC 1/SC 29/WG 7 Coding of Moving Pictures and Audio, ISO/IEC JTC 1/SC 29/WG 7 m 63344, Apr. 2023, 54 pages.

* cited by examiner

Within Prediction

300

Across Prediction

302

Start

S802  Encode vertices in a first face of a polygon mesh

S804  Determining a set of adaptive weights

S806  Performing parallelogram prediction to predict a vertex in a second face

End

800

Start

S902 — Encode vertices in a first face of a polygon mesh

S904 — Perform prediction of a vertex in a second face of the polygon mesh based on one of a nearest vertext prediction and a parallelogram prediction End

900

Start

S1202 — Decimating an input mesh

S1204 — Performing parameterization on the decimated mesh

S1206 — Performing subdivision surface fitting on the parameterized mesh

S1208 — Performing an adaptive wavelet transform on a set of displacement vectors End

1200

METHOD AND APPARATUS FOR ADAPTIVE WEIGHTS FOR PARALLELOGRAM PREDICTION

CROSS-REFERENCE TO RELATED APPLICATION

This application claims priority from U.S. Provisional Application No. 63/544,500 filed on Oct. 17, 2023 and U.S. Provisional Application No. 63/532,583 filed on Aug. 14, 2023, the disclosures of each of which are incorporated herein by reference in their entirety.

FIELD

This disclosure is directed to a set of advanced video coding technologies. More specifically, the present disclosure is directed to a method and apparatus adaptive weights.

BACKGROUND

The advances in 3D capture, modeling, and rendering have promoted the ubiquitous presence of 3D contents across several platforms and devices. Nowadays, it is possible to capture a baby's first step in one continent and allow the grandparents to see (and maybe interact) and enjoy a full immersive experience with the child in another continent. Nevertheless, in order to achieve such realism, models are becoming ever more sophisticated, and a significant amount of data is linked to the creation and consumption of those models. 3D meshes are widely used to represent such immersive contents.

A mesh is composed of several polygons that describe the surface of a volumetric object. Each polygon is defined by its vertices in 3D space and the information of how the vertices are connected, referred to as connectivity information. Optionally, vertex attributes, such as colors, normals, etc., could be associated with the mesh vertices. Attributes could also be associated with the surface of the mesh by exploiting mapping information that parameterizes the mesh with 2D attribute maps. Such mapping is usually described by a set of parametric coordinates, referred to as UV coordinates or texture coordinates, associated with the mesh vertices. 2D attribute maps are used to store high resolution attribute information such as texture, normals, displacements etc. Such information could be used for various purposes such as texture mapping and shading.

A dynamic mesh sequence may require a large amount of data since it may consist of a significant amount of information changing over time. Therefore, efficient compression technologies are required to store and transmit such contents. Mesh compression standards IC, MESHGRID, FAMC were previously developed by MPEG to address dynamic meshes with constant connectivity and time varying geometry and vertex attributes. However, these standards do not take into account time varying attribute maps and connectivity information. DCC (Digital Content Creation) tools usually generate such dynamic meshes. In counterpart, it is challenging for volumetric acquisition techniques to generate a constant connectivity dynamic mesh, especially under real time constraints. This type of contents is not supported by the existing standards. MPEG is planning to develop a new mesh compression standard to directly handle dynamic meshes with time varying connectivity information and optionally time varying attribute maps. This standard targets lossy, and lossless compression for various applications, such as real-time communications, storage, free viewpoint video, AR and VR. Functionalities such as random access and scalable/progressive coding are also considered.

SUMMARY

According to an aspect of the disclosure, a method performed by at least one processor includes encoding a first vertex, a second vertex, and a third vertex of a first face of a polygon mesh; determining a set of adaptive weights that comprise a first weight, a second weight, and a third weight; and performing parallelogram prediction to predict a fourth vertex in a second face of the polygon mesh by applying the first weight to the first vertex, the second weight to the second vertex, and the third weigh to the third vertex, where the first weight is less than 0.8 and greater than 0, where the second weight is greater than −0.8 and less than 0, and where the third weight is less than 0.9 and greater than 0.

According to an aspect of the disclosure, includes encoding a first vertex, a second vertex, and a third vertex of a first face of a polygon mesh, wherein the first face is a dummy face added to the polygon mesh; and performing a prediction of a fourth vertex in a second face of the polygon mesh based on one of a nearest vertex prediction and a parallelogram prediction.

According to an aspect of the disclosure, a method includes decimating an input mesh to generate a decimated mesh; performing parameterization on the decimated mesh to generate a parameterized mesh; performing subdivision surface fitting on the parameterized mesh that subdivides the parameterized mesh according to one or more levels to generate a set of displacement vectors that; and performing an adaptive wavelet transform on the set of displacement vectors.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
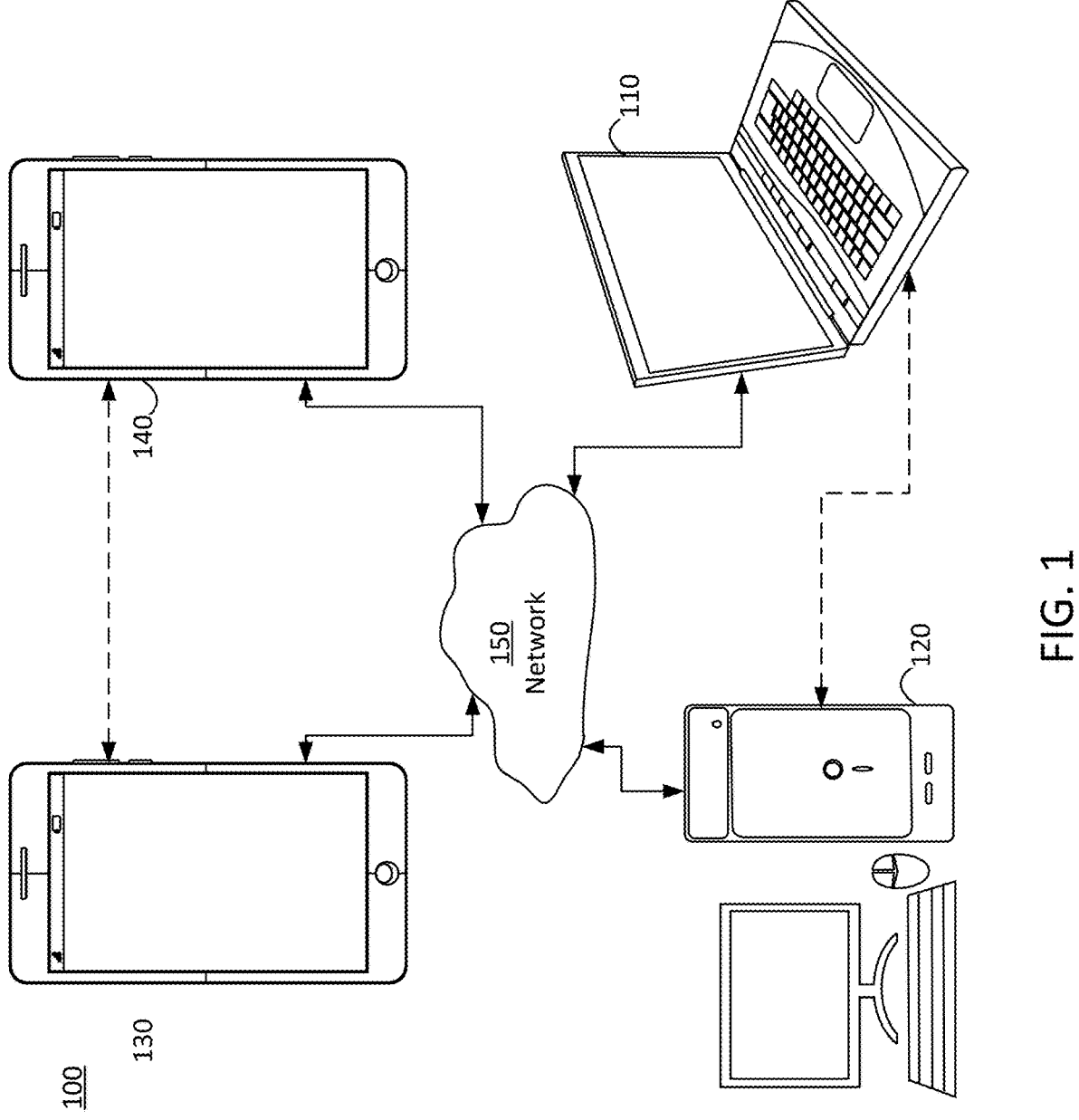
FIG. 1 is a schematic illustration of a block diagram of a communication system, in accordance with embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

Figure 2:
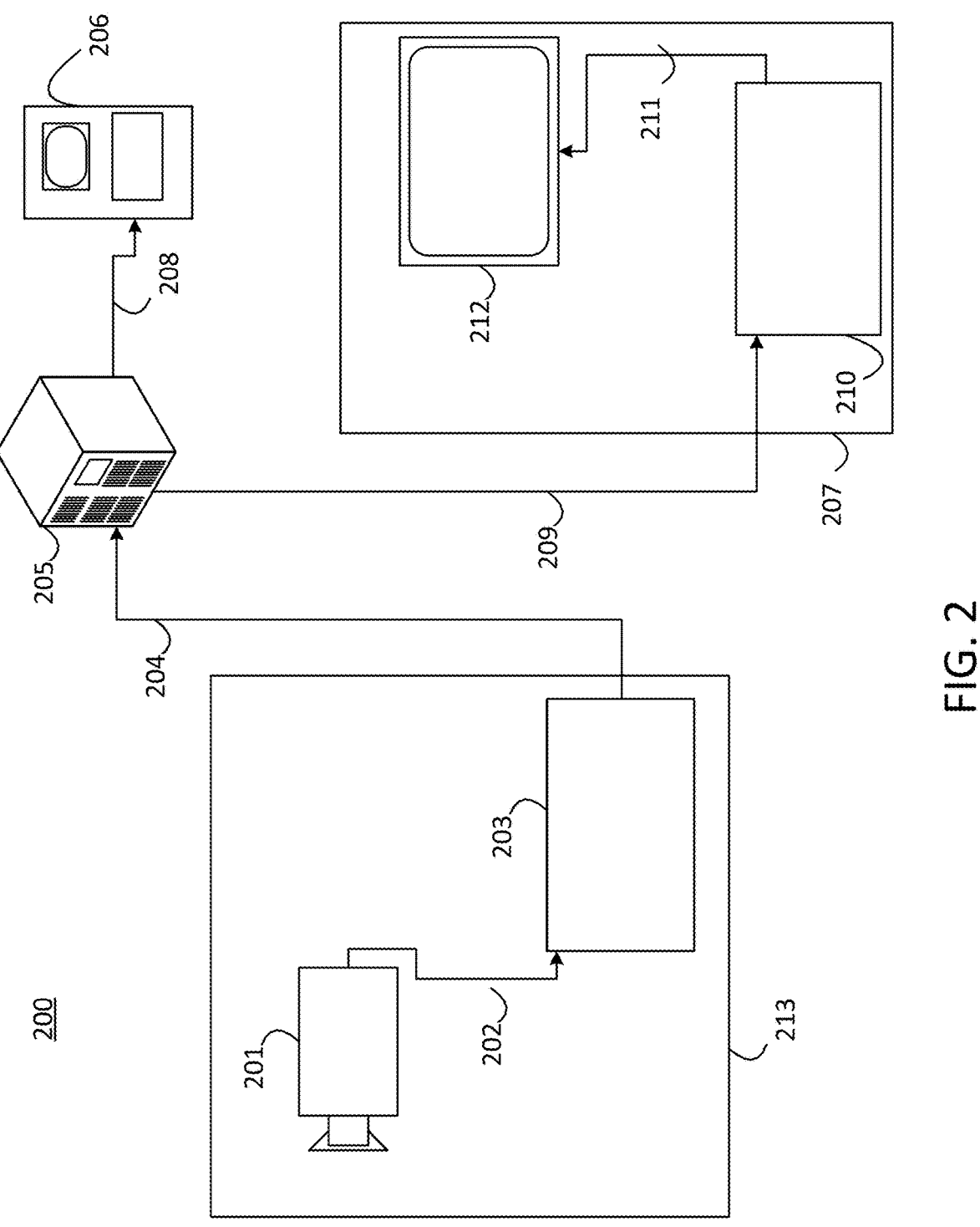
FIG. 2 is a schematic illustration of a block diagram of a streaming system, in accordance with embodiments of the present disclosure.

With reference to FIGS. 1-2, one or more embodiments of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter may be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 may create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, may be processed by the encoder 203 coupled to the video source 201. The encoder 203 may include hardware, software, or a combination thereof to enable or implement aspects of the disclosed subject matter as described in more detail below. The encoder 203 may also generate an encoded video bitstream 204. The encoded video bitstream 204, which may have a lower data volume when compared to the uncompressed stream 202, may be stored on a streaming server 205 for future use. One or more streaming clients 206 and 207 may access the streaming server 205 to retrieve video bit streams 208 and 209, respectively that may be copies of the encoded video bitstream 204.

The streaming clients 207 may include a video decoder 210 and a display 212. The video decoder 210 may, for example, decode video bitstream 209, which is an incoming copy of the encoded video bitstream 204, and create an outgoing video sample stream 211 that may be rendered on the display 212 or another rendering device (not depicted). In some streaming systems, the video bitstreams 204, 208, and 209 may be encoded according to certain video coding/ compression standards.

Embodiments of the present disclosure directed to improving position coding using adaptive multiple parallelogram prediction.

Attributes of a mesh include vertex position, texture coordinate, normal vector, associated texture map. Geometric attributes like vertex position follow a traversal order and implement a predictive coding scheme. That is, a residual vector between the current position and predicted position are encoded to the bitstream as follows:

$$r = v - p. \qquad \text{Eq. (1)}$$

However, for the first three vertices, parallelogram prediction is not available as there is not enough reference vertices, (i.e., at least 3 previous encoded vertices). For the first position, since there is no reference position, the initial predictor is the center of the input mesh. In practice, for quantized mesh, without knowing the bounding box, the initial predictor will use $p_0=(2^{QP-1}, 2^{QP-1}, 2^{QP-1})$ instead. In one or more examples, QP denotes the bitdepth for position attribute.

For the second and third position, the last predictor is used by selecting the previous reconstructed position $p_{i+1}=\hat{v}_i$. Compared to the parallelogram predictor, initial and last predictor are often worst and result in large residual vectors.

In one or more examples, in the context of polygonal meshes, parallelogram prediction has been found to perform optimally with quadrilateral meshes. For a given polygonal mesh, the position of a vertex to be predicted (V) utilizes three previously encoded vertices (A, B, C) as references to estimate its position (V) as follows.

$$P = w_0 A + w_1 B + w_2 C, \qquad \text{Eq. (2)}$$

where weighted factors are often chosen as $w_0=w_2=1$, $w_1=-1$.

Figure 3:
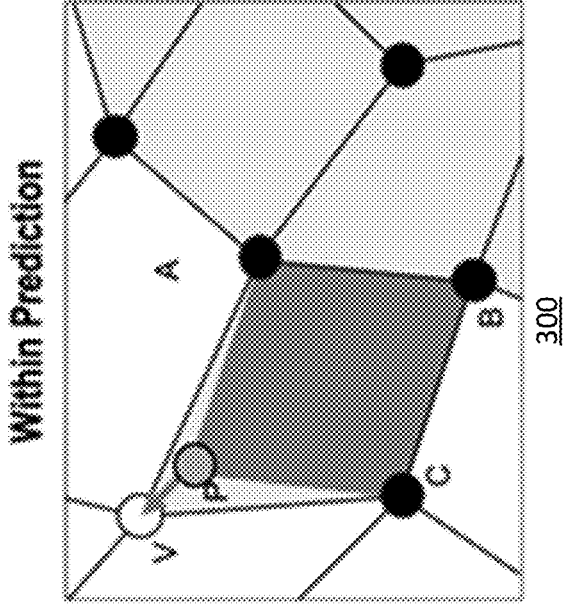
FIG. 3 illustrates example parallelogram prediction for vertex coding in polygonal meshes, in accordance with embodiments of the present disclosure.
Figure 3:
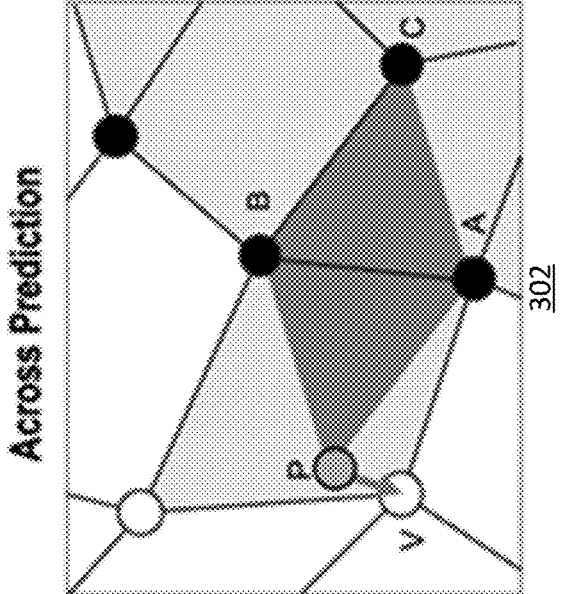

FIG. 3 is an illustration of across and within parallelogram prediction for vertex coding in polygonal meshes. A, B, C are three reference positions for parallelogram prediction.

Within the context of polygonal meshes, parallelogram prediction can be categorized into two types: within prediction (300) and across prediction (302, as depicted in FIG. 3. In within prediction (300), all three reference vertices are situated within the same face, whereas, in across prediction (302), vertex C is obtained from the opposite face. In one or more examples, multi-parallelogram prediction uses the average position given by two or more parallelogram predictions whenever it is possible.

Figure 4:
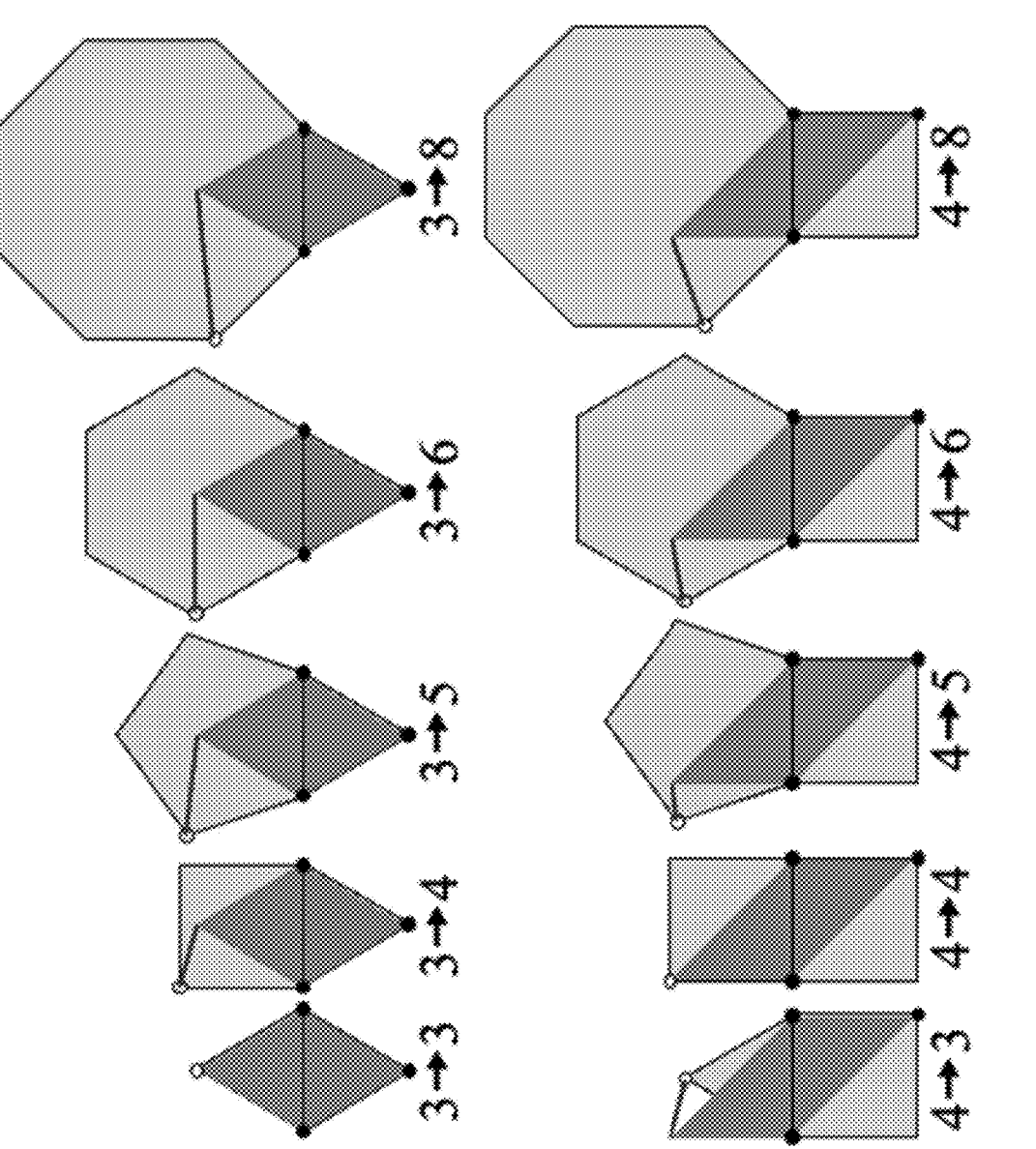
FIG. 4 illustrates example parallelogram across prediction in various opposite face degrees and current face degrees, in accordance with embodiments of the present disclosure.

The common weight of {1, −1, 1} is only a perfect prediction weight for isometry quadrilateral mesh. Furthermore, the common weight depends on the connectivity of faces. For example, depending on the polygonal of the current face of the current vertex, and polygonal of the opposite face, corresponding weights are derived as illustrated in FIG. 4. FIG. 4 illustrates across prediction in various A (opposite)→B (current face degree) examples.

The weights are given as follow. For across prediction with the opposite face degree of 3:

$$w_3 = \begin{cases} 0.917, -0.833, 0.916 & 3 \to 3 \\ 0.621, -0.504, 0.883 & 3 \to 4 \\ 0.557, -0.334, 0.777 & 3 \to 5 \end{cases}$$

For across prediction with the opposite face degree of 4:

$$w_3 = \begin{cases} 1.153, -0.354, 0.201 & 4 \to 3 \\ 1.001, -0.648, 0.647 & 4 \to 4 \end{cases}$$

Figure 5:
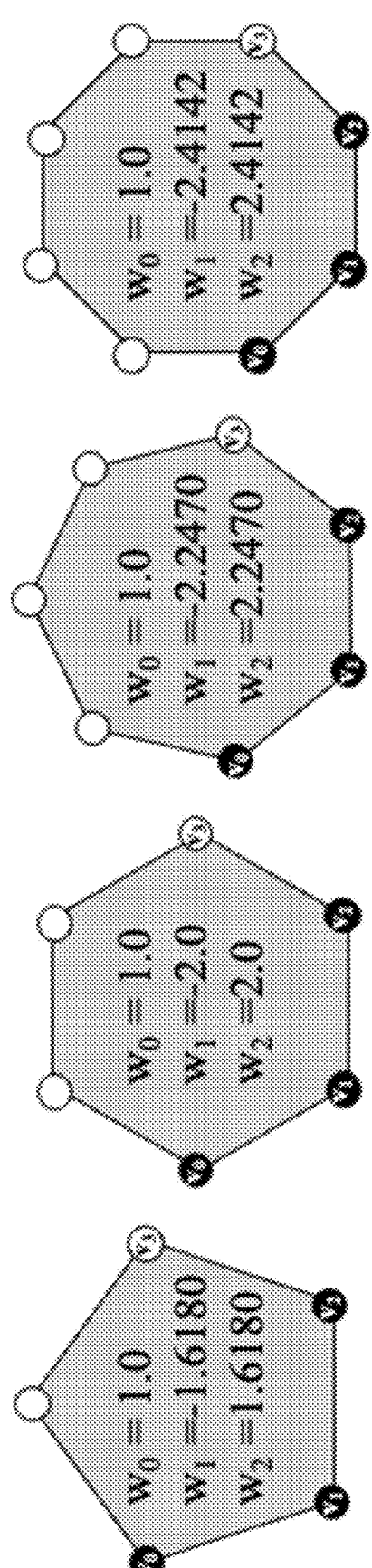
FIG. 5 illustrates example prediction weights for a polygonal mesh when three vertices are encoded, in accordance with embodiments of the present disclosure.
Figure 6:
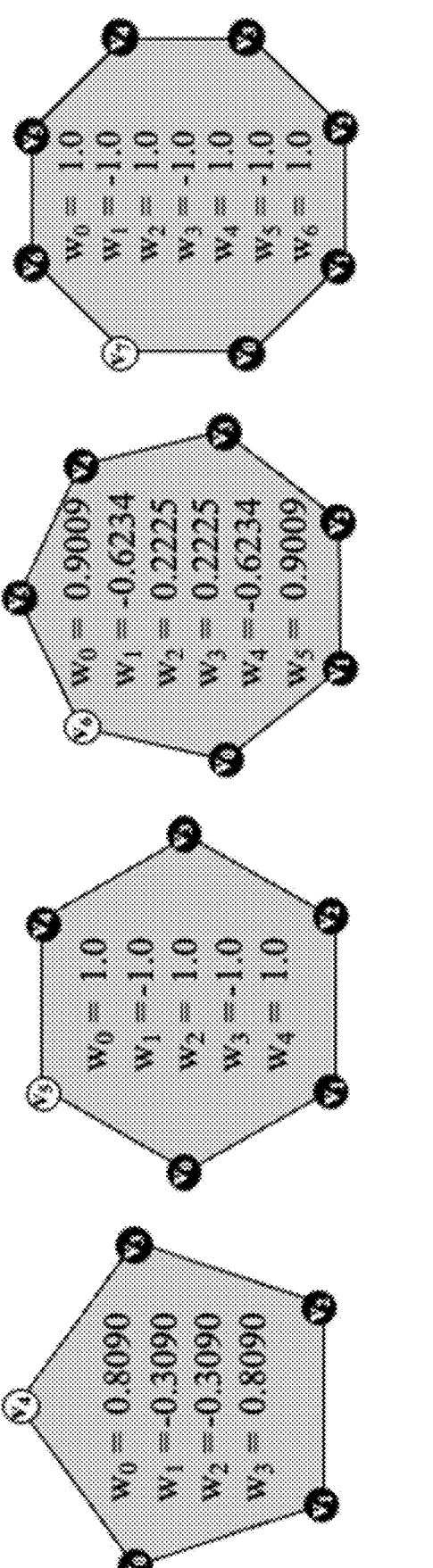
FIG. 6 illustrates example prediction weight for a polygonal mesh for a last vertex, in accordance with embodiments of the present disclosure.

Further derived is the weight for the last position in the polygonal face, where three vertices are encoded in FIG. 5, and one last vertex in FIG. 6. For example, FIG. 5 illustrates example prediction weights for a polygonal mesh when three vertices are encoded. FIG. 6 illustrates example prediction weights for a polygonal mesh for a last vertex.

Parallelogram prediction may result in suboptimal prediction weights for complex meshes. Previously, the parallelogram prediction weights are derived from simple computer-generated meshes which may not yield optimal results for complex meshes. Parallelogram prediction may rely on an assumption on isometric meshes. In this regard, the prior parallelogram prediction weights are based on the assumption of an isometry mesh characterized by having edges of equal length. However, this assumption may not hold true for all meshes, thereby resulting in a large prediction error. Parallelogram prediction further presents challenges with dummy faces. To enhance the traversal efficiency in practice, dummy faces are often added at the boundary of the mesh. These dummy faces are later removed during the decoding process. Accordingly, the parallelogram prediction weights need adjustment to account for these dummy faces to ensure the small prediction error.

The embodiments of the present disclosure may be applied to position coding of any mesh compression algorithm for triangular or polygonal mesh compression algorithm as well as any approach to encode the connectivity.

Mesh compression methods often rely on assumptions that may not always hold true in real-world scenarios. One such assumption is that of isometric vertices. Given that many meshes do not satisfy this condition, across predictions tend to introduce significant correction vectors, denoted by (V-P). To counteract the need for correction vectors, adaptive parallelogram prediction weights may be used.

According to one or more embodiments, a smaller scale parallelogram prediction weights are proposed for parallelogram across prediction from a triangle face. These weights may ensure that the predicted position is more likely to be within the boundary of the current face, thereby reducing the prediction error. In one or more examples, the adaptive parallelogram prediction weights may be structured as:

$$w_3 = \begin{cases} 0.7690, -0.6685, 0.8995 & 3 \rightarrow 3 \\ 0.6210, -0.5040, 0.8830 & 3 \rightarrow 4 \\ 0.5570, -0.3340, 0.7770 & 3 \rightarrow 5 \end{cases}$$

According to one or more embodiments, the parallelogram prediction weights for across parallelogram prediction from triangle face are further adaptive based on the bit-depth of the position attribute. Due to the impact of quantization, with decreasing bit-depth, the quantization error increases make parallelogram prediction less reliable. To address this issue, in one or more examples, the prediction weights may be adjusted considering impacts of different bit-depth. In one or more examples, different weights are designed for different quantization bit-depth (QP). For example, the following weights may be used for different bit depths as follows:

$$w_{3,low} = \begin{cases} 0.5570, -0.3340, 0.7770 & 3 \rightarrow 3 \\ 0.4500, -0.1000, 0.6500 & 3 \rightarrow 4 \quad st. \ QP \leq 9 \\ 0.4100, -0.0500, 0.6100 & 3 \rightarrow 5 \end{cases}$$

$$w_{3,medium} = \begin{cases} 0.6210, -0.5040, 0.8830 & 3 \rightarrow 3 \\ 0.5570, -0.3340, 0.7770 & 3 \rightarrow 4 \quad st. \ QP = 10, 11, 12 \\ 0.4500, -0.1000, 0.6500 & 3 \rightarrow 5 \end{cases}$$

$$w_{3,high} = \begin{cases} 0.7690, -0.6685, 0.8995 & 3 \rightarrow 3 \\ 0.6210, -0.5040, 0.8830 & 3 \rightarrow 4 \quad st. \ QP \geq 13 \\ 0.5570, -0.3340, 0.7770 & 3 \rightarrow 5 \end{cases}$$

As illustrated above, in one or more examples, a QP of less than or equal 9 may be categorized as low, a QP greater than 9 and less than 13 may be categorized as medium, and a bit-depth greater than or equal to 13 may be categorized as high.

Figure 8:
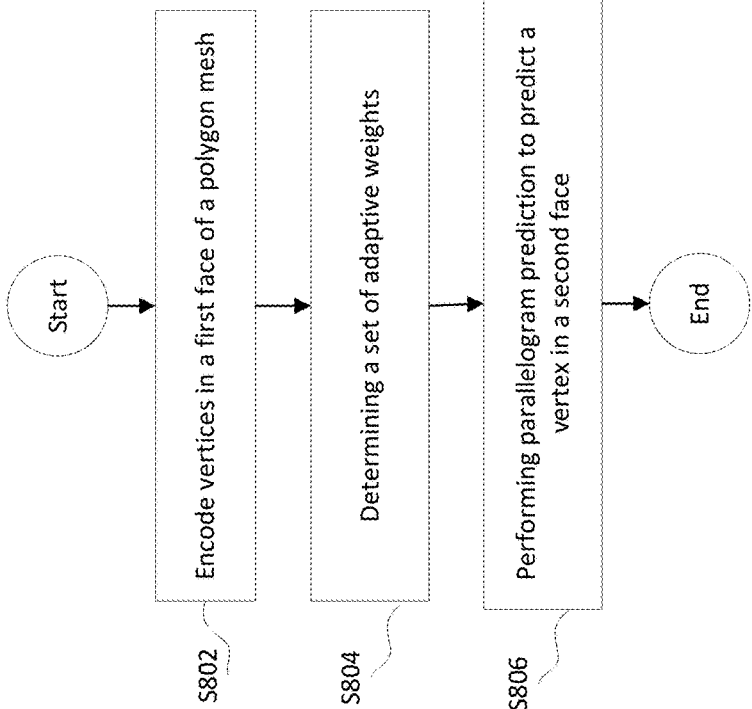
FIG. 8 is a flowchart of an example process for performing parallelogram prediction with adaptive weights, in accordance with embodiments of the present disclosure.

FIG. 8 illustrates a flowchart of an example process 800 for performing parallelogram prediction. The process may be performed by a processor of an encoder that encodes a polygon mesh. The process 800 may start at operation S802 where vertices of a first face of a polygon mesh are encoded. The first face may include at least a first vertex, a second vertex, and a third vertex forming a triangle that are encoded.

The process proceeds to operation S804 where a set of adaptive weights are determined for the first through third vertices. In one or more examples, the adaptive weights may be determined based on a number of vertices in a current face (e.g., second face) in which a fourth vertex is predicted based on the first through third vertices. In one or more examples, the adaptive weights may be determined based on a quantization bit-depth of the vertices in the polygon mesh.

The process proceeds to operation S806 where parallelogram prediction is performed to predict a fourth vertex in the second face based on the adaptive weights and the encoded first through third vertices.

In one or more examples, the decoding process may perform similar features as the encoder in reverse order. For example, the decoder may decode first through third vertices on a first face in a polygon mesh, determine adaptive weights, and predict a fourth vertex in a second face using parallelogram prediction and a displacement vector.

Dummy faces that are added at the boundaries of the meshes present challenges for prediction. The vertices of these dummy faces often do not line on the same planar surface. However, parallelogram prediction is generally effective for planar surfaces, and may provide inaccurate results when applied to such dummy faces.

Figure 7:
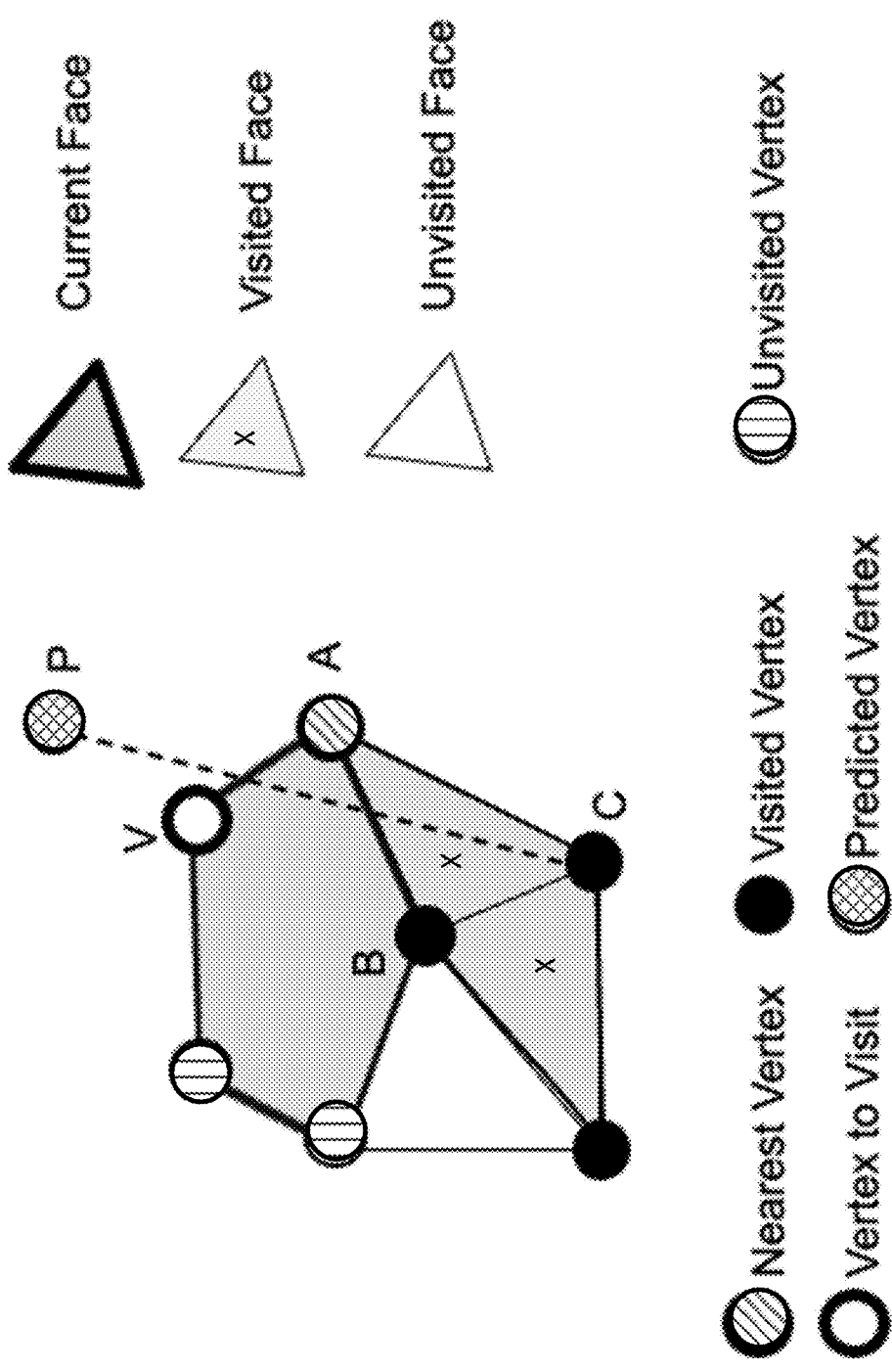
FIG. 7 illustrates an example across prediction with nearest vertex, in accordance with embodiments of the present disclosure.

According to one or more embodiments, the nearest predictor may be used to handle vertices in the dummy face. This approach leverages the nearest encoded vertex as a reference to predict and encode the current vertex in the dummy face. FIG. 7 illustrates an example of across prediction using the nearest vertex method. For example in FIG. 7, when dealing with a dummy face, a nearest vertex (e.g., in this case A) is utilized as the predictor for the current vertex V.

In general, vertices in a dummy face with more than three encoded vertices may be encoded using the within parallelogram prediction. Due to the likelihood of a dummy face being non planar, in one or more examples, the nearest prediction is used to replace the within parallelogram prediction.

Unlike 3D scan meshes where the boundaries can have varying topologies, computer generated meshes typically have flat local boundaries. Therefore, according to one or more embodiments, the parallelogram prediction weight is adjusted instead of using the nearest predictor.

In one or more examples, a dummy weight is used to provide more emphasis to the nearest vertex and direction toward the nearest vertex while assigning smaller or even negative weights to the other vertices. For example, $$w_{dummy} = \{w_0, w_1, w_2\}$$

where $w_0 \in [1, 2)$, $w_1 \in [-0.1, 0]$, and $w_2 = [-0.3, 0.1]$.

According to one or more embodiments, the dummy face weight may be selected as:

$$w_{dummy} = \{1.305, -0.060, -0.245\}$$

According to one or more embodiments, adaptively switching between an adaptive weight and the default weight [1, −1, 1] may be performed. In many cases, the original mesh is quadrilateral mesh but has been triangulated. However, the default parallelogram weight of [1, −1, 1] is optimal for quadrilateral meshes. Therefore, according to one or more embodiments, triangulated quadrilateral meshes are detected using the default parallelogram weights.

In one or more examples, the top N most popular prediction weights are kept. The top N prediction weights that are kept may be the top N prediction weights with the smallest prediction error. If the default the weight is the top one, then the default weight is most likely the triangulated quadrilateral mesh. Therefore, the default weight is used instead.

According to one or more embodiments, a threshold of THRES is used to decide whether the current mesh is a triangulated quadrilateral mesh. The current mesh is classified as triangulated quadmesh if the percentage of default weights as the best mode is greater than THRES. In one or more examples, the THRESH is 60%.

Given the triangulated quadrilateral mesh, due to the limitation of traversal algorithm, consecutive traversal may not form the original quadrilateral face. Therefore, the default weight is not effective in this case. Accordingly, in this embodiment, the default weights may be applied adaptively.

In one or more examples, this decision may be made based on the already visited face. Assuming the current face are A-B-D, with the previous opposite face are A-B-C, then check the already encoded face around A to see how many neighbor faces are paired to the original quadrilateral face by comparing the default prediction weight. If all encoded faces around A, and encoded face around B are already paired, then the A-B-C and A-B-D are most likely not forming the quadrilateral face. Therefore, the default weight may not be used in this case.

On the other hand, if previous faces around A or around B are paired but not A-B-C, then it is most likely A-B-C and A-B-D form the quadrilateral face. Therefore, the default prediction weight may applied.

Figure 9:
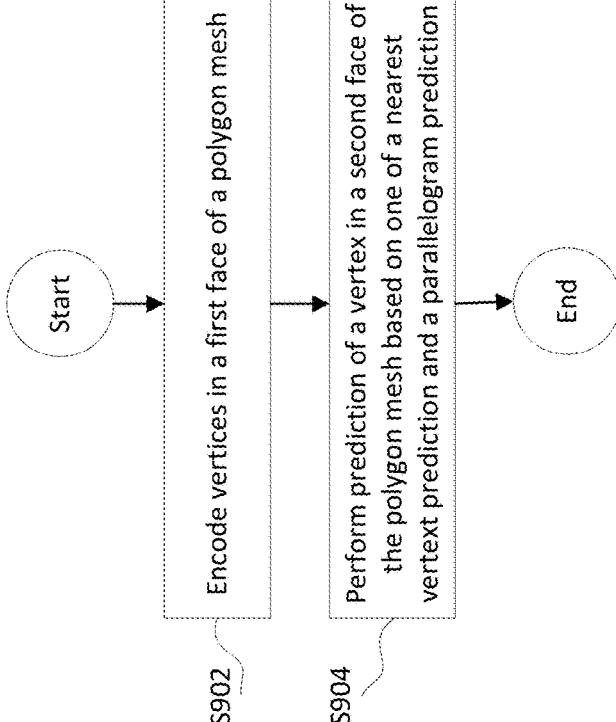
FIG. 9 is a flowchart of an example process for performing prediction for a dummy face with adaptive weights, in accordance with embodiments of the present disclosure.

FIG. 9 illustrates an example process 900 performed by a processor of an encoder. The process 900 may start at operation S902 where vertices in a first face of a polygon mesh are encoded. The vertices may include a first vertex, a second vertex, and a third vertex forming a triangle. The first face may be a dummy face added to the polygon mesh.

The process proceeds to operation S902 where prediction of a vertex in a second face of the polygon mesh is performed. In one or more examples, the prediction may be based on using the nearest vertex prediction as discussed above. The prediction may be based on the parallelogram prediction that uses adaptive weights or default weights as discussed above.

Figure 10:
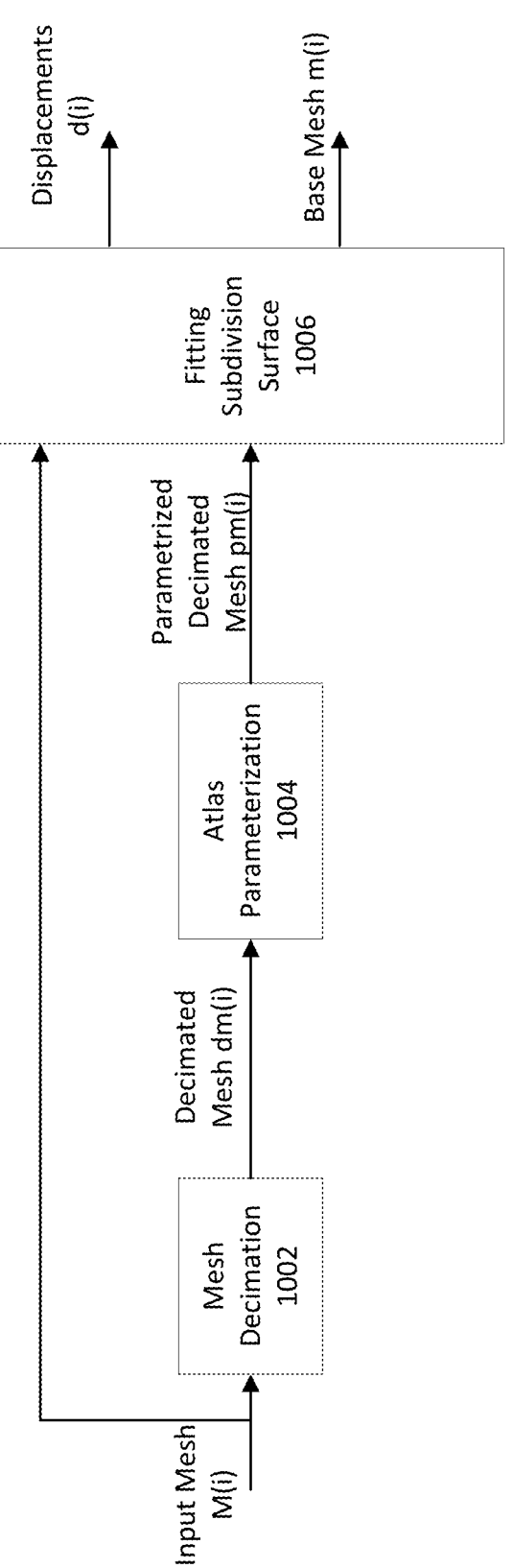
FIG. 10 illustrates an example system for pre-processing in Moving Picture Experts Group (MPEG) Video-based Dynamic Mesh Coding (V-DMC), in accordance with embodiments of the present disclosure.

In MPEG V-DMC WD 2.0, the mesh encoding process starts with a pre-processing. FIG. 10 illustrates an example system 1000 for performing MPEG V-DMC. The pre-processing converts the input dynamic mesh, denoted M(i), into a base mesh m(i) together with a set of displacements d(i). The encoder compresses this new representation and generates a compressed bitstream b(i). The pre-processing includes mesh decimation 1002, followed by atlas parameterization 1004, and then subdivision surface fitting 1006, as illustrated in FIG. 10. The mesh decimation may use a simplification technique to decimate the input mesh M(i), and produce the decimated mesh dm(i). The decimated mesh dm(i) is then re-parameterized. The generated mesh is denoted as pm(i). The subdivision surface fitting takes as input the re-parameterized mesh pm(i) and the input mesh M(i) and produces the base mesh m(i) together with a set of displacements d(i).

Figure 11:
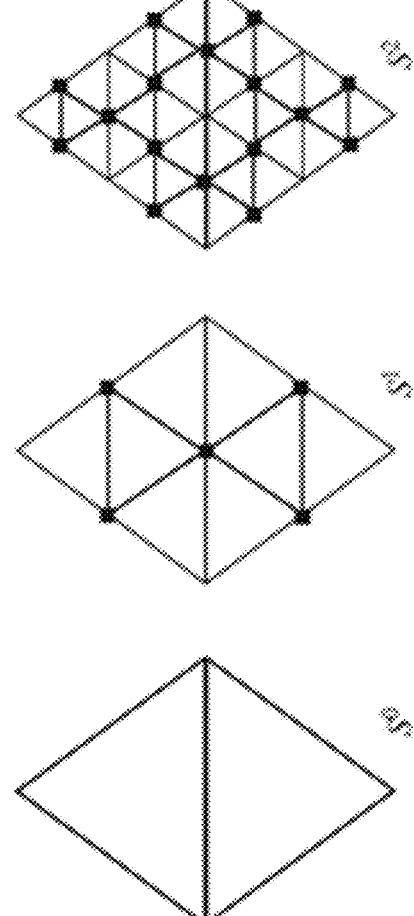
FIG. 11 illustrates an example mid-point subdivision scheme, in accordance with embodiments of the present disclosure.

In one or more examples, the pm(i) is subdivided by applying the mid-point subdivision scheme, which at each subdivision iteration subdivides each triangle into 4 sub-triangles as illustrates in FIG. 11. In FIG. 11, $S^0$ may represent a first level, $S^1$ may represent a second level, and $S^2$ may represent a third level. During each mid-point subdivision, the mid-point subdivision level is increased by 1. The displacement field d(i) may be computed by determining, for each vertex of the subdivided mesh, the nearest point on the surface of the original mesh M(i).

The encoder may optionally encode a set of displacement vectors associated with the subdivided mesh vertices, referred to as the displacement field d(i). First, the reconstructed quantized base mesh m'(i) may be used to update the displacement field d(i) to generate an updated displacement field d'(i). A wavelet transform may then be applied to d'(i) in which a set of wavelet coefficients is generated. The wavelet coefficients may then be quantized, and may be compressed by using arithmetic coding, a traditional image/video encoder, or some other encoder. The wavelet transform employed in MPEG V-DMC 2.0 is a linear wavelet transform and consists of a prediction process and update process.

The prediction process may be defined as follows:

$$\text{Signal}(v) \leftarrow \text{Signal}(v) - \frac{1}{2}(\text{Signal}(v_1) + \text{Signal}(v_2)), \qquad \text{Eq. (3)}$$

where v is the vertex introduced in the middle of the edge $(v_1, v_2)$; and Signal (v), Signal $(v_1)$, and Signal $(v_2)$ are the values of the geometry/vertex attribute signals at the vertices v, $v_1$, and $v_2$, respectively.

The update process may be defined as follows:

$$\text{Signal}(v) \leftarrow \text{Signal}(v) + \frac{1}{8}\sum_{w \in v^*} \text{Signal}(w), \qquad \text{Eq. (4)}$$

where v* is the set of neighboring vertices of the vertex v.

The embodiments of the present disclosure provide methods and systems for using adaptive wavelet transform.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

In the embodiments of the present disclosure, a number of methods and systems are proposed for adaptive wavelet transform for vertex position or displacement vector coding in mesh compression. Note that they can be applied individually or by any form of combinations. Further, the disclosed methods and systems are not limited to mesh compression. They can also be applied to, for example, audio processing, image processing, video processing, or signal processing in general.

The embodiments of the present disclosure are directed to a level-dependent adaptive wavelet transform, where the weight in the update process is level-dependent and adaptive to the number of neighboring vertices. The adaptive wavelet transform may include a prediction process and update process.

According to one or more embodiments, the mid-point subdivision level prediction process may be defined as follows:

$$\text{Signal}(v) \leftarrow \text{Signal}(v) - \frac{1}{2}(\text{Signal}(v_1) + \text{Signal}(v_2)), \qquad \text{Eq. (5)}$$

where v is the vertex introduced in the middle of the edge $(v_1, v_2)$; and Signal (v), Signal $(v_1)$, and Signal $(v_2)$ are the values of the geometry/vertex attribute signals at the vertices v, $v_1$, and $v_2$, respectively.

In one or more examples, the update process may be defined as follows:

$$\text{Signal}(v) \leftarrow \text{Signal}(v) + \frac{c\_l}{|v^*|} \sum_{w \in v^*} \text{Signal}(w), \qquad \text{Eq. (6)}$$

where c_l is a scalar dependent on the level l, $v^*$ is the set of neighboring vertices of the vertex v, and $|v^*|$ is the cardinal number of $v^*$, e.g., the number of vertices in the set $v^*$.

According to one or more embodiments, the inverse adaptive wavelet transform may include an update process and prediction process, where the update process comes before the prediction process.

In one or more examples, the update process in the inverse adaptive transform may be defined as follows:

$$\text{Signal}(v) \leftarrow \text{Signal}(v) - \frac{c\_l}{|v^*|} \sum_{w \in v^*} \text{Signal}(w), \qquad \text{Eq. (7)}$$

where v is the vertex introduced in the middle of the edge $(v_1, v_2)$; and Signal (v), Signal $(v_1)$, and Signal $(v_2)$ are the values of the geometry/vertex attribute signals at the vertices v, $v_1$, and $v_2$, respectively.

According to one or more embodiments, the scalar c_l in Eq. (6) and (7) is a constant. The scalar c_l may be an integer, a rational number, a real number, etc. According to one or more embodiments, the scalar c_l in Eq. (6) and (7) is a multiple of an exponentiation, where the mid-point subdivision level is the exponent as follows:

$$c = c_0 * b^l, \qquad \text{Eq. (8)}$$

where b is the base of the exponentiation, l is the level in the mid-point subdivision, and $c_0$ is the multiple. In some implementations, the base b is set to the value of 2.0.

According to one or more embodiments, the scalar c_l in Eq. (6) and (7) are equal to the same value as follows:

$$c = c_0, \qquad \text{Eq. (9)}$$

where $c_0$ is the scalar at the level 0.

According to one or more embodiments, the adaptive wavelet transform is applied to selected mesh frame(s) of a mesh sequence.

In one or more examples, the adaptive wavelet transform is applied to selected region(s) of a mesh frame. In one or more examples, the adaptive wavelet transform is applied to a base layer of a mesh frame. In one or more examples, the adaptive wavelet transform is applied to some enhancement layer(s) of a mesh frame. In one or more examples, the adaptive wavelet transform is applied to selected frequency band(s) of a mesh frame.

Figure 12:
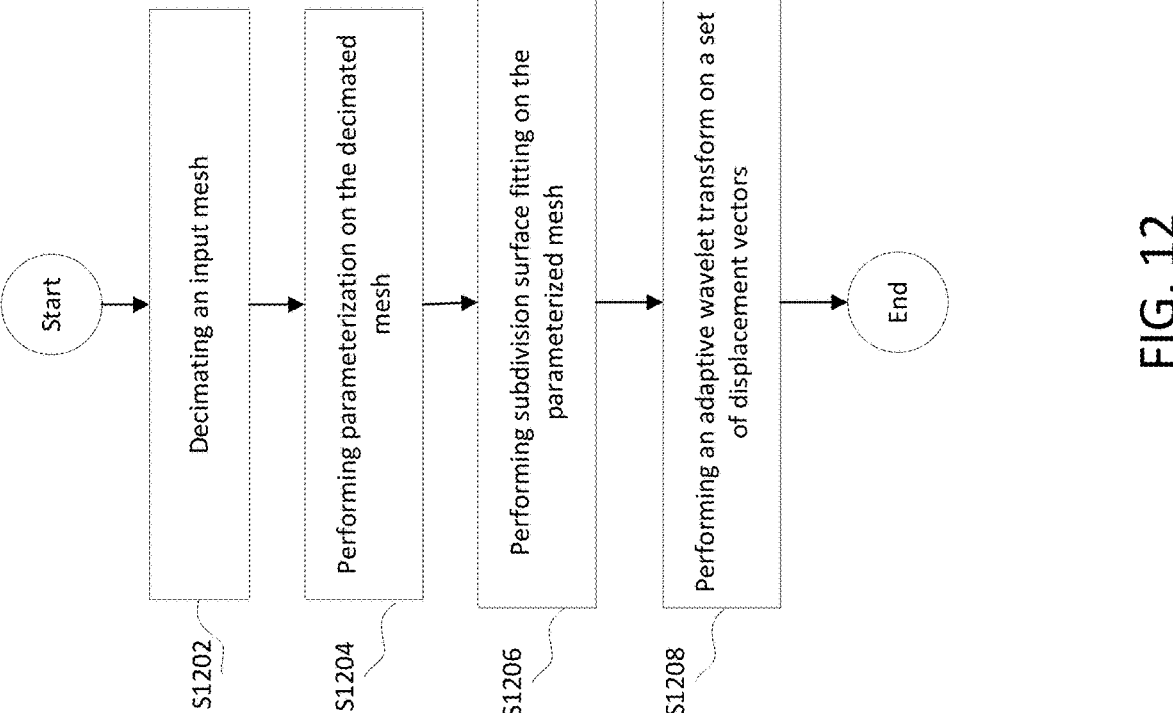
FIG. 12 illustrates a flowchart of an example process for performing wavelet processing with adaptive weights, in accordance with embodiments of the present disclosure.

FIG. 12 is an example process 1200 for performing adaptive wavelet transform. The process 1200 may be performed by a processor of an encoder.

The process may start at operation S1202 where an input mesh is decimated to generate a decimated mesh. For example mesh decimation 1002 may be performed on an input mesh M(i) to generate the decimated mesh dm(i).

The process may proceed to operation S1204 where a parameterization of the decimated mesh is performed to generate a parameterized mesh. For example, parameterization 1004 may be performed on decimated mesh dm(i) to generate parameterized decimated mesh pm(i).

The process may proceed to operation S1206 where a subdivision surface fitting is performed on the parameterized mesh to generate displacement vectors and a base mesh. For example, subdivision surface fitting 1006 may be performed on the parameterized decimated mesh pm(i) to generate displacements d(i) and base mesh m(i).

The process may proceed to operation S1208 where an adaptive wavelet transform is performed on a set of displacement vectors. The adaptive wavelet transform may be performed in accordance with EQs. (5) and (6) as discussed above.

In one or more examples, the decoder may perform similar features of the process 1200 performed by the encoder in reverse order.

The techniques, described above, may be implemented as computer software using computer-readable instructions and physically stored in one or more computer-readable media. For example, FIG. 13 shows a computer system 1300 suitable for implementing certain embodiments of the disclosure.

The computer software may be coded using any suitable machine code or computer language, that may be subject to assembly, compilation, linking, or like mechanisms to create code including instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 13:
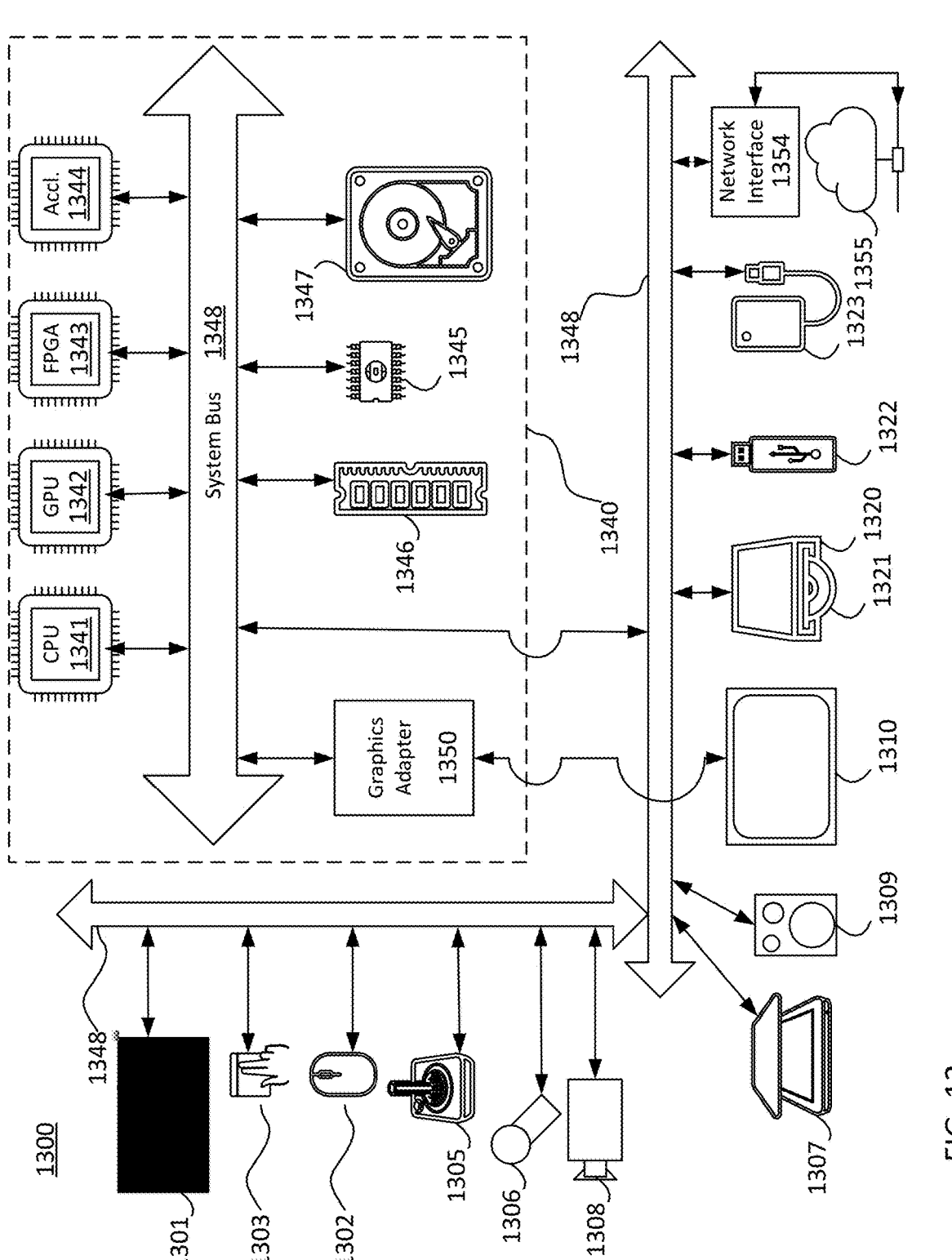
FIG. 13 is a diagram of a computer system suitable for implementing the embodiments of the present disclosure, in accordance with embodiment of the present disclosure.

The components shown in FIG. 13 for computer system 1300 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 1300.

Computer system 1300 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1301, mouse 1302, trackpad 1303, touch screen 1310, data-glove, joystick 1305, microphone 1306, scanner 1307, camera 1308.

Computer system 1300 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1310, data glove, or joystick 1305, but there may also be tactile feedback devices that do not serve as input devices). For example, such devices may be audio output devices (such as: speakers 1309, headphones (not depicted)), visual output devices (such as screens 1310 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1300 may also include human accessible storage devices and their associated media such as optical media including CD/DVD ROM/RW 1320 with CD/DVD or the like media 1321, thumb-drive 1322, removable hard drive or solid state drive 1323, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1300 may also include interface to one or more communication networks. Networks may be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 1349 (such as, for example USB ports of the computer system 1300; others are commonly integrated into the core of the computer system 1300 by attachment to a system bus as described below (for example Ethernet interface into a PC computer system or cellular network interface into a smartphone computer system). Using any of these networks, computer system 1300 may communicate with other entities. Such communication may be uni-directional, receive only (for example, broadcast TV), uni-directional send-only (for example CANbus to certain CANbus devices), or bi-directional, for example to other computer systems using local or wide area digital networks. Such communication may include communication to a cloud computing environment 1355. Certain protocols and protocol stacks may be used on each of those networks and network interfaces as described above.

Aforementioned human interface devices, human-accessible storage devices, and network interfaces 1354 may be attached to a core 1340 of the computer system 1300.

The core 1340 may include one or more Central Processing Units (CPU) 1341, Graphics Processing Units (GPU) 1342, specialized programmable processing units in the form of Field Programmable Gate Areas (FPGA) 1343, hardware accelerators for certain tasks 1344, and so forth.

These devices, along with Read-only memory (ROM) 1345, Random-access memory 1346, internal mass storage such as internal non-user accessible hard drives, SSDs, and the like 1347, may be connected through a system bus 1348. In some computer systems, the system bus 1348 may be accessible in the form of one or more physical plugs to enable extensions by additional CPUs, GPU, and the like. The peripheral devices may be attached either directly to the core's system bus 1348, or through a peripheral bus 1349. Architectures for a peripheral bus include PCI, USB, and the like. A graphics adapter 1350 may be included in the core 1340.

CPUs 1341, GPUs 1342, FPGAs 1343, and accelerators 1344 may execute certain instructions that, in combination, may make up the aforementioned computer code. That computer code may be stored in ROM 1345 or RAM 1346. Transitional data may be also be stored in RAM 1346, whereas permanent data may be stored for example, in the internal mass storage 1347. Fast storage and retrieve to any of the memory devices may be enabled through the use of cache memory, that may be closely associated with one or more CPU 1341, GPU 1342, mass storage 1347, ROM 1345, RAM 1346, and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system having architecture 1300, and specifically the core 1340 may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 1340 that are of non-transitory nature, such as core-internal mass storage 1347 or ROM 1345. The software implementing various embodiments of the present disclosure may be stored in such devices and executed by core 1340. A computer-readable medium may include one or more memory devices or chips, according to particular needs. The software may cause the core 1340 and specifically the processors therein (including CPU, GPU, FPGA, and the like) to execute particular processes or particular parts of particular processes described herein, including defining data structures stored in RAM 1346 and modifying such data structures according to the processes defined by the software. In addition or as an alternative, the computer system may provide functionality as a result of logic hardwired or otherwise embodied in a circuit (for example: accelerator 1344), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method performed by at least one processor, the method comprising:

encoding a first vertex, a second vertex, and a third vertex of a first face of a polygon mesh;

determining a set of adaptive weights that comprise a first weight, a second weight, and a third weight based on a quantization bit-depth of a position attribute associated with the vertices in the polygon mesh, when the quantization bit-depth is less than or equal to a first bit-depth threshold, the quantization bit-depth is classified as low, in which when the quantization bit-depth is greater than the first bit-depth threshold and less than or equal to a second bit-depth threshold that is greater than the first bit-depth threshold, the quantization bit-depth is classified as medium, and when the quantization bit-depth is greater than a third bit-depth threshold greater than the second bit-depth threshold, the quantization bit-depth is classified as high; and performing parallelogram prediction to predict a fourth vertex in a second face of the polygon mesh by applying the first weight to the first vertex, the second weight to the second vertex, and the third weigh to the third vertex, wherein the first weight is less than 0.8 and greater than 0, wherein the second weight is greater than −0.8 and less than 0, and wherein the third weight is less than 0.9 and greater than 0.

2. The method according to claim 1, wherein the determining the set of adaptive weights is based on a number of vertices in the second face.

3. The method according to claim 2, wherein the first weight and the third weight decrease as the number of vertices in the second face increase, and the second weight increases as the number of vertices in the second face increase.

4. The method according to claim 1, wherein the first weight, the second, weight, and third weight when the quantization bit-depth is classified as low are lower than the first weight, the second weight, and the third weight, respectively, when the quantization bit-depth is classified as medium.

5. The method according to claim 4, wherein the first weight, the second, weight, and third weight when the quantization bit-depth is classified as medium are lower than the first weight, the second weight, and the third weight, respectively, when the quantization bit-depth is classified as high.

6. A method performed by at least one processor, the method comprising:

encoding a first vertex, a second vertex, and a third vertex of a first face of a polygon mesh, wherein the first face is a dummy face added to the polygon mesh; and performing a prediction of a fourth vertex in a second face of the polygon mesh based on one of a nearest vertex prediction and a parallelogram prediction that uses an encoded first vertex, an encoded second vertex, and an encoded third vertex in the dummy face, the encoded first vertex, the encoded second vertex, and the encoded third vertex being weighted in accordance with one of a set of adaptive weights and one of a set of default weights, in which the set of default weights comprises a first weight of 1 for the encoded first vertex, a weight of −1 for the encoded second vertex, and a weight of 1 for the encoded third vertex, the parallelogram prediction uses the set of adaptive weights based on a determination that the first face and the second face do not form a quadrilateral face, the parallelogram prediction uses the set of default weights based on a determination that the first face and the second face form the quadrilateral face, and the first face and the second face are determined to form the quadrilateral face based on a determination that the set of default weights provides the smallest prediction error out of a top N prediction weights, wherein N is an integer greater than zero.

7. The method according to claim 6, wherein the fourth vertex is determined according to the nearest vertex prediction that predicts the fourth vertex based on an encoded vertex in the dummy face that is nearest to the fourth vertex.

8. The method according to claim 6, wherein the set of adaptive weights comprises (i) a first weight for the encoded first vertex greater than or equal 1 and less than 2, (ii) a second weight for the encoded second vertex greater than or equal to −0.1 and less than or equal to 0, and (iii) a third weight for the third vertex greater than or equal to −0.3 and less than or equal to 0.1.

9. A method performed by at least one processor, the method comprising:

decimating an input mesh to generate a decimated mesh;

performing parameterization on the decimated mesh to generate a parameterized mesh;

performing subdivision surface fitting on the parameterized mesh that subdivides the parameterized mesh according to one or more levels to generate a set of displacement vectors that; and performing an adaptive wavelet transform on the set of displacement vectors.

10. The method according to claim 9, wherein the adaptive wavelet transform is based on a scalar value and a number of vertices neighboring a vertex introduced during the performing the subdivision surface fitting.

11. The method of claim 10, wherein the scalar value is constant.

12. The method claim 11, wherein the scalar value is dependent on a level of subdivision in the performing the subdivision surface fitting.

13. The method of claim 12, wherein the scalar value is dependent on a multiple of a base value raised to the power of the level of the subdivision.

* * * * *